US005591077A

United States Patent [19]
Rowe

[11] Patent Number: 5,591,077
[45] Date of Patent: Jan. 7, 1997

[54] GAMBREL SUPPORT STRUCTURE FOR ANIMAL CARCASS

[76] Inventor: Jerry D. Rowe, P.O. Box 1076, 1595 S. Hwy. 789, Lander, Wyo. 82520

[21] Appl. No.: 187,655

[22] Filed: Jan. 26, 1994

[51] Int. Cl.[6] .................................................. A22B 5/00
[52] U.S. Cl. ............................................ 452/189; 452/192
[58] Field of Search .................................... 452/187, 197, 452/188, 189, 192

[56] References Cited

U.S. PATENT DOCUMENTS

| | | | |
|---|---|---|---|
| 565,943 | 8/1896 | Swartz et al. | 452/189 |
| 902,655 | 11/1908 | Heim . | |
| 1,020,843 | 3/1912 | Petersen . | |
| 1,030,683 | 6/1912 | Roskopf . | |
| 1,085,439 | 1/1914 | Knudson . | |
| 1,148,393 | 7/1915 | McGrath . | |
| 1,311,779 | 7/1919 | Shank | 452/189 |
| 2,622,540 | 12/1952 | Stewart et al. | 104/5 |
| 2,710,766 | 6/1955 | Erlewine | 294/79 |
| 4,027,357 | 6/1977 | Morris | 17/44 |
| 4,763,942 | 8/1988 | Lyon | 452/192 |
| 4,828,307 | 5/1989 | Sokol et al. | 452/192 |
| 4,909,555 | 3/1990 | Blasi | 453/189 |
| 5,288,265 | 2/1994 | Beason et al. | 452/187 |

*Primary Examiner*—Willis Little
*Attorney, Agent, or Firm*—Andrus, Sceales, Starke & Sawall

[57] ABSTRACT

A gambrel apparatus is provided for the support of animals and the like. The gambrel apparatus includes a spreader bar adapted to permit convenient and rapid adjustment of its length. End pieces of the spreader bar include special entailing hooks for mounting the animal thereon. Each hook is also connected to a common central connector which, in turn, is connected to a hoist unit. The hoist unit permits a single individual to raise and lower the animal with respect to the ground or other supporting area.

11 Claims, 2 Drawing Sheets

GAMBREL SUPPORT STRUCTURE FOR ANIMAL CARCASS

BACKGROUND OF THE INVENTION

This invention relates to an animal gambrel for hanging an animal carcass, including a whole or half carcass.

Animal gambrel devices are widely used for hanging of the carcass of a slaughtered animal, and particularly by hunters for hanging of a slaughtered game animal for supporting of the carcass. In the hunting of deer and the like, after killing of the deer it is generally opened to remove the various innards. The animal is then transported to a hunting lodge or camp and supported in a hanging position for draining, aging and other cleaning of the body of the animal. It will also be used as a support while skinning an animal and the like.

Conventionally, in a game support structure, the gambrel consists of a rigid crossbar with impaling and supporting hook members secured to the opposite ends of the rigid member. A flexible support structure, generally in the form of an inverted V-shaped configuration, is coupled to the hook members with a common connected located centrally of the flexible member. Thus, a hoist-like line in the form of a strap, chain and the like is provided for supporting of the gambrel with the animal attached to the end hooks on a suitable raised vertical support such as the limb of a tree or other supporting device.

The gambrel device, particularly for hunters, should also be folded into a compact assembly with relative ease of assembly and disassembly. The gambrel device, which is convenient for storage and transportation as well as use, is of a significant consideration to game hunters and the like.

Various adjustable animal gambrels have been disclosed in the prior art. U.S. Pat. No. 4,909,555, which issued Mar. 20, 1990, discloses an adjustable gambrel with a special spreader bar in the form of a telescopic member with multiple hole and pin couplings as well as a special hook structure having a lug secured within an end opening in the rigid spreader which establishes and maintains a particular hook orientation. The hook members having a straight shank is rotatably mounted in end bearings in the opposite ends of the spreader bar. U.S. Pat. No. 902,655 which issued Nov. 3, 1908, discloses a gambrel with an adjustable spreader bar member and hook members. Other patents of interest are cited in such prior art and set forth in the Information Disclosure Statement filed in this application and disclose other forms of gambrel devices.

The prior art generally includes relatively special complex mechanisms and/or very special formed and provided components. All the special and complex constructions contribute to the cost of the unit. Further, a particular problem, which is presented by the prior art, is the supporting of one half of an animal as well as a complete animal with a single designed gambrel.

The gambrel device can, of course, be used at home, on a farm, and in other environments where a hoise might be needed to vertically support a load structure, with a spreader.

There is a need, therefore, for an adjustable, rugged gambrel apparatus which can be separated for compact storage and transportation as well as readily assembled for use, either by a hunter or other user.

A gambrel is necessarily rated to support a particular load and is desirable provided with simplified units for raising of the load into the hanging positions.

SUMMARY OF THE INVENTION

The present invention is particularly directed to a gambrel device for hanging of either whole or half animal carcasses, and is specially constructed for compact storage and carrying as well as simple assembly and disassembly. The gambrel device of this invention is rugged and reliable, and can be readily constructed to handle relatively heavy loads on the order of 1,000 lbs. Generally, in accordance with the teaching of this invention, the gambrel apparatus includes a spreader bar adapted to permit convenient and rapid adjustment of its length in combination with special hook members fitted to the ends and with a releasable movement to permit adjustment for a straight down pull on the gambrel with the hook members both secured into spaced relation on a full animal carcass, as well as with a single one of the hook members secured to a load such as one half animal carcass. More particularly, in accordance with the present invention, the spreader bar is formed as a suitable metal or other high strength tubing, and preferably formed of a plated, tubular steel. A plurality of tubular elements with at least one adjustable interconnection permitting adjusting to a particular animal. The end pieces of the spreader bar include special entailing hooks, each of which is similarly secured to the corresponding end member of the spreader bar. The hook is specially formed with an offset configuration, including a hook end, a connecting offset shank portion terminating in an upper connector. The connector end of the hook member may be a simple eyelet connector. The end member of the spreader bar is formed with an opening which is larger than the shank portion and through which the hook member is extended with the shank portion generally located within the hole opening. Suitable flexible members, preferably heavy flat webbing, are secured to the connectors and joined at the outer ends by a common hanging connector, such as a simple ring member. A hanging device is coupled to the hanging connector for the raising and lowering of the animal. The raising and lowering element is preferably a multiple hoist unit, including a heavy, flat webbing. A single person can readily pull a large animal, such as the largest deer, to the hanging position.

The heavy, flat webbing will not twist or knot under all anticipated usage. With the large hanging hooks inserted into the two hind legs of a deer, the deer will hang downward; centered within the apparatus. If only half a carcass is supported, a single hook member is secured into the leg tendon or other leg portion and will hang downwardly, again in line with the hook, which is reoriented to directly support the half carcass in line with the hoist proper and particularly the hanging connectors.

By appropriate selection of the parts in an adjustable spreader bar, the gambrel can be readily disassembled to a compact assembly for storage in a simple carrying unit, such as a bag, case, or the like. It is formed of rugged materials and adapted to various load requirements.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DESCRIPTION OF ILLUSTRATED EMBODIMENT

Figure 1:
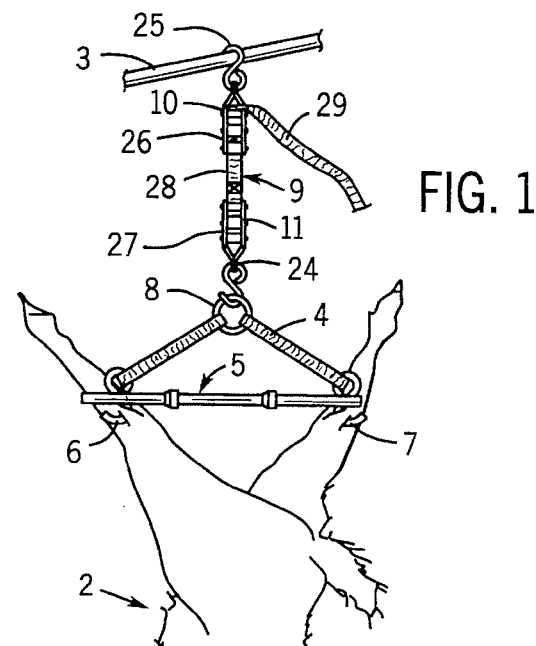
FIG. 1 is an elevational view of a gambrel device constructed in accordance with the teaching of the present invention and shown in place supporting a deer.

Referring to the drawing, and particularly to FIG. 1, an adjustable gambrel unit 1 constructed in accordance with the teaching of the present invention, is illustrated supporting a deer carcass 2. The gambrel unit 1 is suspended from a supporting rod-like member 3, such as a raised rod, tree branch, or the like. The gambrel unit 1 generally includes an inverted V shaped hanging member 4 having a spreader crossbar 5 with outer end hook units 6 and 7. The hook units 6 and 7 are shown impaling the legs of the deer immediately above the knee joint. The hook units 6 and 7 are connected to a common, central upper connector 8. A hoist unit 9 is connected to the connector 8 to suspend the carcass 2 in a raised position. The hoist unit 9 may be any conventional hoist device having upper and lower pulley units 10 and 11 for convenient operation with creating abnormal leads beyond the capability of an individual number or the like. The hoist unit 9 permits essentially a single individual to raise and lower the carcass 2 with respect to the ground or other supporting area. A gambrel unit for sole suspending of a carcass 2, such as a deer, is well known in the art. The present invention is particularly directed to the construction of the gambrel unit 1 to permit the convenient assembly and disassembly thereof for storage and transport, as well as assembly for use as illustrated in FIG. 1, as well as improved carcass support.

More particularly, in the illustrated embodiment of the invention, the spreader crossbar 5 of the gambrel unit 1 is shown as a multiple part element for adjusting the lengths of the crossbar 5. In particular, three essentially equal length sections 12, 13 and 14 are provided with the end sections 12 and 14 telescopically connected to the central section 13. The illustrated crossbar is formed of tubular sections, with the one end section 12 formed as a simple tubular metal member, and the central section 13 and second end section formed as similar elongated metal tubes of the same diameter as section 13, with a coupling end 15 and 16, respectively, similarly shaped for telescoped relation to the end of a straight tube portions. Thus, a simple metal tube can have an outer end surged or otherwise expanded to form an internal diameter corresponding to the external diameter of the basic tubular members. The center member thus can be readily inserted or removed to adjust the length of the spreader crossbar.

The spreader bar sections 12–14 preferably are formed of heavy steel tubing with appropriate plating to provide not only ease of assembly and disassembly, but a long life assembly for use in outdoor environments.

The hook units 6 and 7 are similarly secured to the outer end of the spreader crossbar 5.

Figure 3:
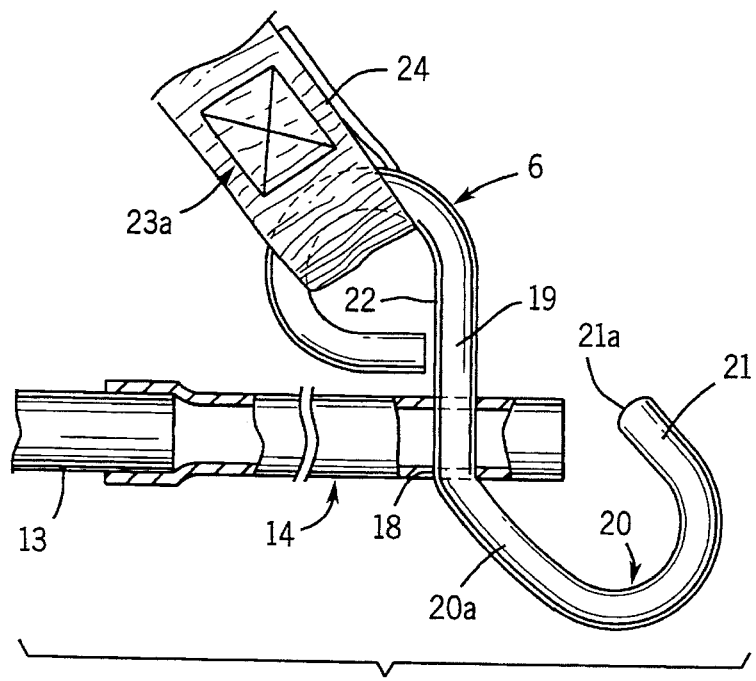
FIG. 3 is a view similar to FIG. 2 with parts broken away and sectioned to more clearly disclose the construction of the preferred embodiment of the invention.
Figure 4:
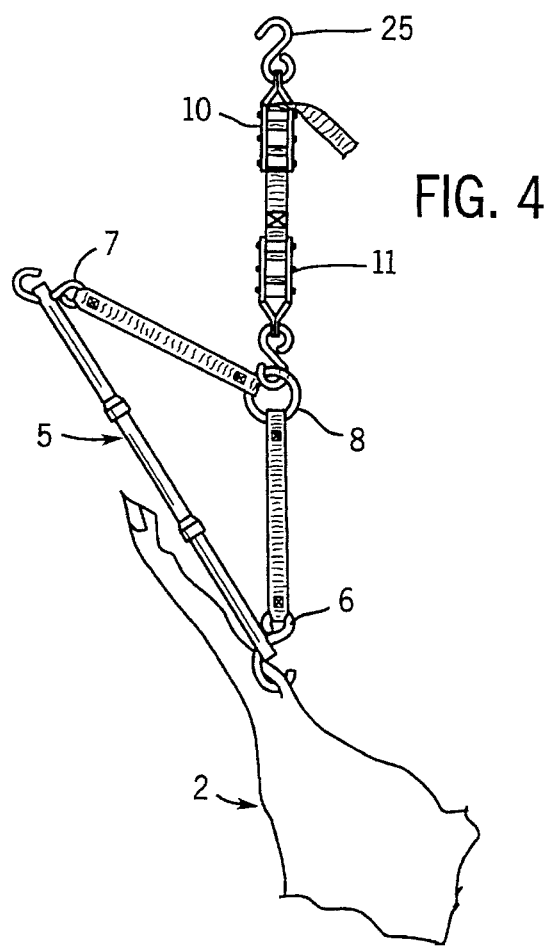
FIG. 4 is a view similar to FIG. 1 illustrating the gambrel device supporting one half of an animal carcass.

As most clearly shown in FIGS. 3 and 4, the portion of the spreader crossbar 5 has a vertical opening 18 with the hook unit 6 passed therethrough. The hook unit is a solid round metal member and is specially formed with a straight vertical shank 19 of a length somewhat longer than hole or opening in the spreader crossbar 5. The lower end of the hook unit 6 includes a hook 20 with an inner leg 20a of the hook unit extending outwardly at a slight angle from the shank 19 and then curved backwardly as outer spaced leg 21 to form an outer hook end, which may be formed with a tapered tip 21a for piercing of the hide of a carcass. The hide of a carcass, however, can readily be pierced with a knife or other blunt instrument to form an opening to receive the hook end leg 21, without the necessity for the sharp tip. A blunt tip is desirable for purposes of safety. The shank 19 projects upwardly and is bent on itself to form an eyelet 22. The opening 18 for receiving the hook 6 is a simple opening formed in the bar 12. The opening is slightly larger than the diameter of shank and hook 20 to allow easy assembly and removal of the hook from the bar. This permits convenient disassembly for storage and transport as well as convenient assembly for on-site use.

The hook unit 7 is similarly formed and secured to the opposite end of the spreader bar within a similar opening. Each hook unit 6 and 7 is similarly constructed to the connector 8 by a heavy, flat webbing 23. Thus, referring to hook unit 6, the heavy, flat webbing 23 is wound about the hook eye and sewn as at 23a or otherwise affixed onto itself to firmly attach the webbing to the hook unit. The opposite or other end is similarly constructed to the connector 8, which is shown as a connecting ring 8, to receive both of the webs.

The hoist unit 9 is releasably secured to the ring 8 by a hook member 24 extending downwardly from the lower pulley 11. The upper pulley 10 is similarly secured to the hook member 25. The hoist unit 9 can readily be formed of a solid nylon rollers connected, with 2 and 3 rollers spaced roller sets 26 and 27 in-line, by a heavy, flat webbing 28 as the interconnecting adjustable member. The free end 29 of the webbing 28 is readily available to the operator for the raising and lowering of the animal carcass 2 to the hook units 6 and 7.

With the animal secured to the gambrel unit 1, the hook members are pulled upwardly and inwardly to generally hold the carcass in the illustrated position.

When the device is not in use, the spreader crossbar 5 is readily disassembled, with the end members readily removed from the hook unit 6 and 7. The hoist unit 9 can readily be disassembled from the connector 8 as well as the supporting rod unit 3 to provide a complete disassembly of the components. The hoist can, of course, be drawn to a minimum length with the webbing wrapped on itself. The total assembly can then be collapsed into individual parts for storage within a canvas bag or other similar support structure, not shown, for storage and transport. The width of the spreader crossbar 5 can, of course, be readily adjusted with the three sections 12–14, to accommodate different animals and other similar loads.

The illustrated embodiment of the crossbar provides a very simple, inexpensive, but reliable supporting structure contributing to the cost effectiveness of the illustrated embodiment of the invention. Obviously, any other adjustable rod-like member can be used, formed of metal or other high strength materials including high strength plastics and the like where desired. Similarly, the interconnecting structure to a common connector can take any one of many different variations and forms within the teaching of the present invention.

Each hook member is shown as a solid metal member, buy may of course be formed of any other suitable material or of other suitable full strength configuration, including a tubular construction of a tubular metal. It is important, however, that it maintain the strength specification for the load and the like.

Figure 2:
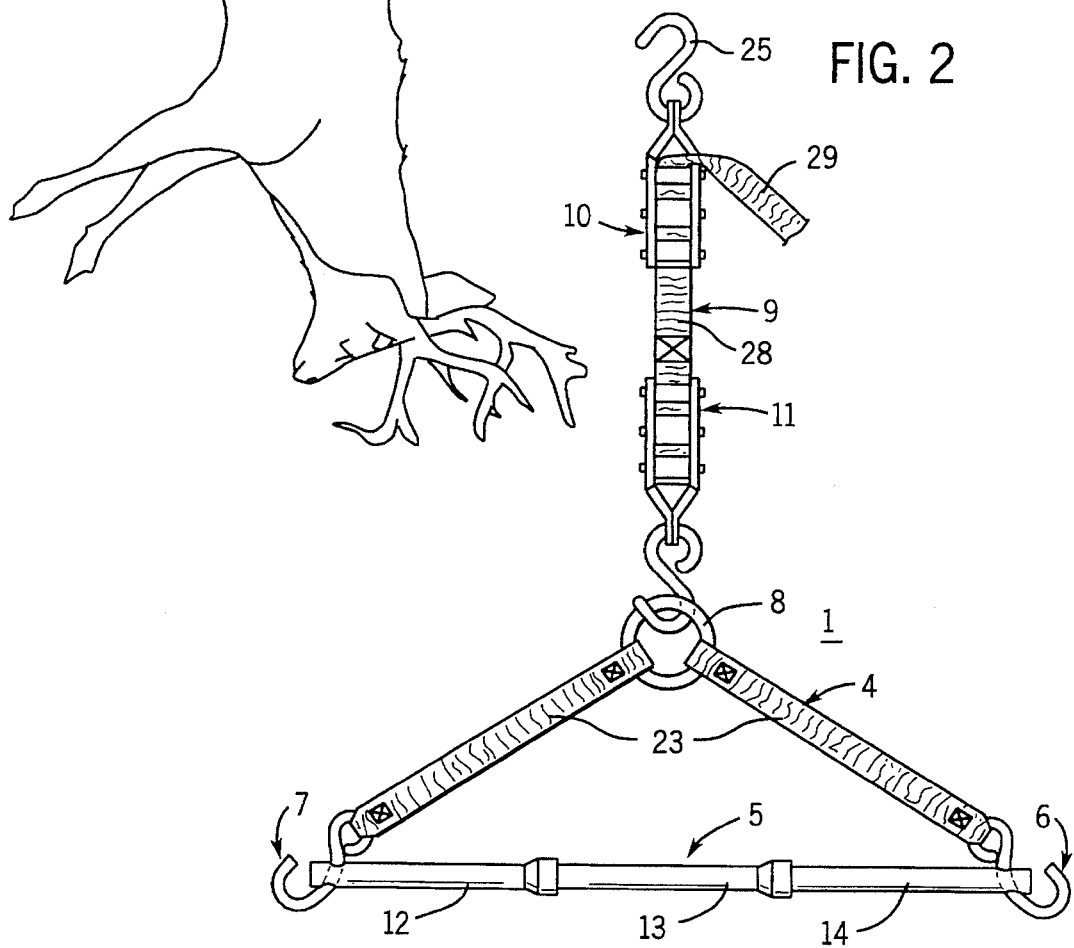
FIG. 2 is an enlarged elevational view of the gambrel apparatus, as shown in FIG. 1, with the animal removed.

The illustrated embodiment of the gambrel unit 1 can also be readily applied to support a single half carcass 30 of an animal or other similar load structure; for example, as shown in FIG. 2. Thus, a single hook unit 6 is secured within the hind leg 31 of the half carcass 30. The gambrel unit 1 will reorient itself with the hook unit 6 and the interconnecting web reoriented in line with the hoist unit 9. Thus, in processing of the animal, the carcass can be split, while in the gambrel unit, such as shown in FIG. 1, the one half removed while retaining support of the other half of the animal.

As illustrated in FIG. 2, with the single load application, the unit can be used even without the spreader bar. In the embodiment of FIG. 2, spreader bar 5 functions to support the unused hook member 6 in spaced relation to the loaded hook member 7.

Further, although particularly adapted for supporting of an animal carcass, it can, of course, be used as a supporting structure in other applications. With the hoist structure reasonably secured to the connector, the hoist structure as such can be separately used for carrying of other types of loads and the like.

The present invention in summary provides an improved gambrel which can be readily constructed with commercially available components, and readily understood and inexpensive fabrication and manufacturing teachers.

Various modes of carrying out the invention are contemplated as being within the scope of the following claims particularly pointing out and distinctly claiming the subject matter which is regarded as the invention.

I claim:

1. A gambrel apparatus for supporting of animals and the like, comprising:

a spreader unit of a rigid construction having longitudinally spaced opposite end members, each said end member having a corresponding aligned lateral opening spaced from the end of the end member and define a substantially vertically oriented opening extending through the spreader unit;

a first hook unit secured within the said opening in a first of said end members, and a second hook unit secured within the said opening of the second of said end members, each hook unit being of an essentially corresponding construction, each of said hook units comprising a straight shank portion with an upper connector portion and a lower hook portion integrally formed at respective ends, said straight shank located within the opening of the end member and having a diameter smaller than said end opening and allowing reorienting of the hook member within the opening, said straight shank portion having a length slightly greater than said opening, said straight shank portion being in parallel alignment with the opening, said hook portion including an extension of said shank extending outwardly at an acute angle from said straight shank portion and curved backwardly on itself to form an outer U-shaped hook leg including an outer curved leg portion, said upper connector portion being formed as an extension of said shank substantially adjacent said end member and being extended inwardly to the opposite side of said shank from said U-shaped hooked leg, said hook units adapted to be impaled on spaced portions of an animal for supporting said animal in a vertical orientation with said straight shank portion in a vertical orientation and adapted to be impaled by one of said hook units on a single portion of an animal for support of the last named animal in a vertical orientation with said straight shank portion at an acute angle to the orientation and said outer curved leg portion engaging the impaled portion of the animal, and a common connector having first and second connecting members connected one each to one of the upper connector portions and located generally centrally between said hook units.

2. The apparatus of claim 1, including a common lifting unit connected to said common connector for supporting of said gambrel in a raised position.

3. The apparatus of claim 1, wherein said spreader unit is formed of a plurality of rigid and tubular members of the same diameter, at least one of said members having a tubular outer end expanded radially outwardly to define an inner diameter corresponding to the outer diameter of an adjacent tubular member for releasable connection to said adjacent tubular member.

4. The apparatus of claim 1, wherein each said upper connector portions being an eyelet, and said first and second connecting members are flat, heavy webs secured respectively to said eyelets and to a common support member.

5. The apparatus of claim 2, wherein said lifting unit is a pulley hoist unit for ease of lifting and lowering of loads secured to said gambrel apparatus.

6. The apparatus of claim 2, wherein said spreader member and said hook units are constructed and arranged to support a half of an animal carcass on a single one of the hooks with the animal substantially in-line with said common connectors and said hanging members.

7. The apparatus of claim 1, wherein said spreader bar includes three rigid pipe members of substantially equal length and including a first end member, a second end member, and a central member;

said first end member having a constant diameter end including said hook opening, the second end of said first end member having an expanded end portion defining an inner diameter corresponding to said constant diameter portion;

said central member having an elongated tubular member portion of said constant diameter and an expanded end member corresponding to the expanded end member of said first end crossbar member; said central member being essentially constructed as said first crossbar member;

said second end member being a straight tubular member of a constant diameter for coupling to said central section and having an outer end including said hook opening.

8. The apparatus of claim 7, wherein the diameter of said opening and the diameter of said hook member is interrelated to permit assembly and disassembly of said hook member by passing of the hook end through said opening.

9. The apparatus of claim 2, having a load rating of at least 800 lbs, and said common lifting unit is a hoist unit having a rating of at least 1,000 lbs.

10. The apparatus of claim 1, wherein said spreader is adjustable from 0 to 21 inches in width.

11. The apparatus of claim 1, wherein said spreader member is formed of a steel tubing having an outer plated coating.

\* \* \* \* \*